United States Patent [19]
Blonsky et al.

[11] Patent Number: 5,800,944
[45] Date of Patent: Sep. 1, 1998

[54] THIN PROFILE BATTERY WITH IMPROVED SEPARATOR AND GASKET CONSTRUCTION

[75] Inventors: Peter M. Blonsky; Mark E. Tuttle, both of Boise, Id.

[73] Assignee: Micron Communications, Inc., Boise, Id.

[21] Appl. No.: 928,898

[22] Filed: Sep. 12, 1997

Related U.S. Application Data

[60] Continuation of Ser. No. 744,743, Oct. 28, 1996, abandoned, which is a division of Ser. No. 588,559, Jan. 18, 1996, Pat. No. 5,652,070, which is a division of Ser. No. 205,611, Feb. 2, 1994, Pat. No. 5,547,781.

[51] Int. Cl.$^6$ .................................................. H01M 2/08
[52] U.S. Cl. ................... 429/174; 429/162; 429/185
[58] Field of Search ................................ 429/174, 162, 429/164, 166, 185

[56] References Cited

U.S. PATENT DOCUMENTS

| | | | |
|---|---|---|---|
| 2,422,045 | 6/1947 | Ruben | 126/167 |
| 2,712,565 | 7/1955 | Williams, Jr. | 136/107 |
| 2,836,643 | 5/1958 | Sindel | 429/162 |
| 2,951,891 | 9/1960 | Kempf | 136/169 |
| 3,004,094 | 10/1961 | Haessly | 136/175 |
| 3,023,259 | 2/1962 | Coler et al. | 429/127 |
| 3,096,217 | 7/1963 | Clune | 136/107 |
| 3,185,595 | 5/1965 | Schenk, Jr. | 136/133 |
| 3,290,753 | 12/1966 | Chang | 427/272 |
| 3,440,110 | 4/1969 | Arbter | 136/166 |
| 3,457,117 | 7/1969 | Angelovich | 136/133 |
| 3,673,000 | 6/1972 | Ruetschi | 136/107 |
| 3,708,343 | 1/1973 | Walsh | 136/133 |
| 3,713,896 | 1/1973 | Feldhake | 136/133 |
| 3,741,812 | 6/1973 | Spellman et al. | 136/107 |
| 3,799,959 | 3/1974 | Epstein | 260/429 |
| 3,884,723 | 5/1975 | Wuttke | 429/162 |
| 3,891,462 | 6/1975 | Langkau | 136/111 |
| 3,935,026 | 1/1976 | Howard | 136/20 |
| 4,025,702 | 5/1977 | Nishimura et al. | 429/142 |
| 4,048,405 | 9/1977 | Megahed | 429/206 |
| 4,121,020 | 10/1978 | Epstein et al. | 429/162 |
| 4,121,021 | 10/1978 | Ogawa et al. | 429/162 |
| 4,122,241 | 10/1978 | Ciliberti, Jr. et al. | 429/133 |
| 4,209,574 | 6/1980 | Ruetschi | 429/133 |
| 4,224,387 | 9/1980 | Nakayama | 429/133 |
| 4,263,380 | 4/1981 | Riedl | 429/162 |
| 4,333,995 | 6/1982 | Ishida et al. | 429/174 X |
| 4,374,186 | 2/1983 | McCartney et al. | 429/154 |
| 4,374,909 | 2/1983 | Tucholski | 429/174 |
| 4,409,730 | 10/1983 | Goebel | 29/623.5 |
| 4,521,500 | 6/1985 | Watanabe | 429/174 |
| 4,537,647 | 8/1985 | Foster | 427/282 |
| 4,632,887 | 12/1986 | Jung | 429/181 |
| 5,180,645 | 1/1993 | More | 429/127 |
| 5,187,033 | 2/1993 | Koshiba | 429/235 |
| 5,288,565 | 2/1994 | Gruenstern | 429/162 |
| 5,338,625 | 8/1994 | Bates et al. | 429/127 X |
| 5,401,805 | 3/1995 | Yasuda et al. | 429/174 |
| 5,490,320 | 2/1996 | Hasegawa et al. | 429/223 |
| 5,512,387 | 4/1996 | Ovshinsky | 429/162 X |
| 5,547,781 | 8/1996 | Blonsky et al. | 429/174 |
| 5,629,108 | 5/1997 | Lake . | |

*Primary Examiner*—John S. Maples
*Attorney, Agent, or Firm*—Wells, St. John, Roberts, Gregory & Matkin, P.S.

[57] ABSTRACT

A button-type battery has an anode, a cathode, and an electrolyte encased with two terminal housing members. The terminal housing members have respective peripheries that are crimped together to form a fluid-tight seal. An insulating gasket is provided between the peripheries to electrically insulate the two terminal housing members. A porous separator physically separates the anode and cathode and extends between the terminal housing member peripheries at least partially into the fluid-tight seal. According to one aspect, the separator overlaps the gasket in the seal. According to another aspect, the separator and gasket are formed of a single, integral piece of material.

2 Claims, 5 Drawing Sheets

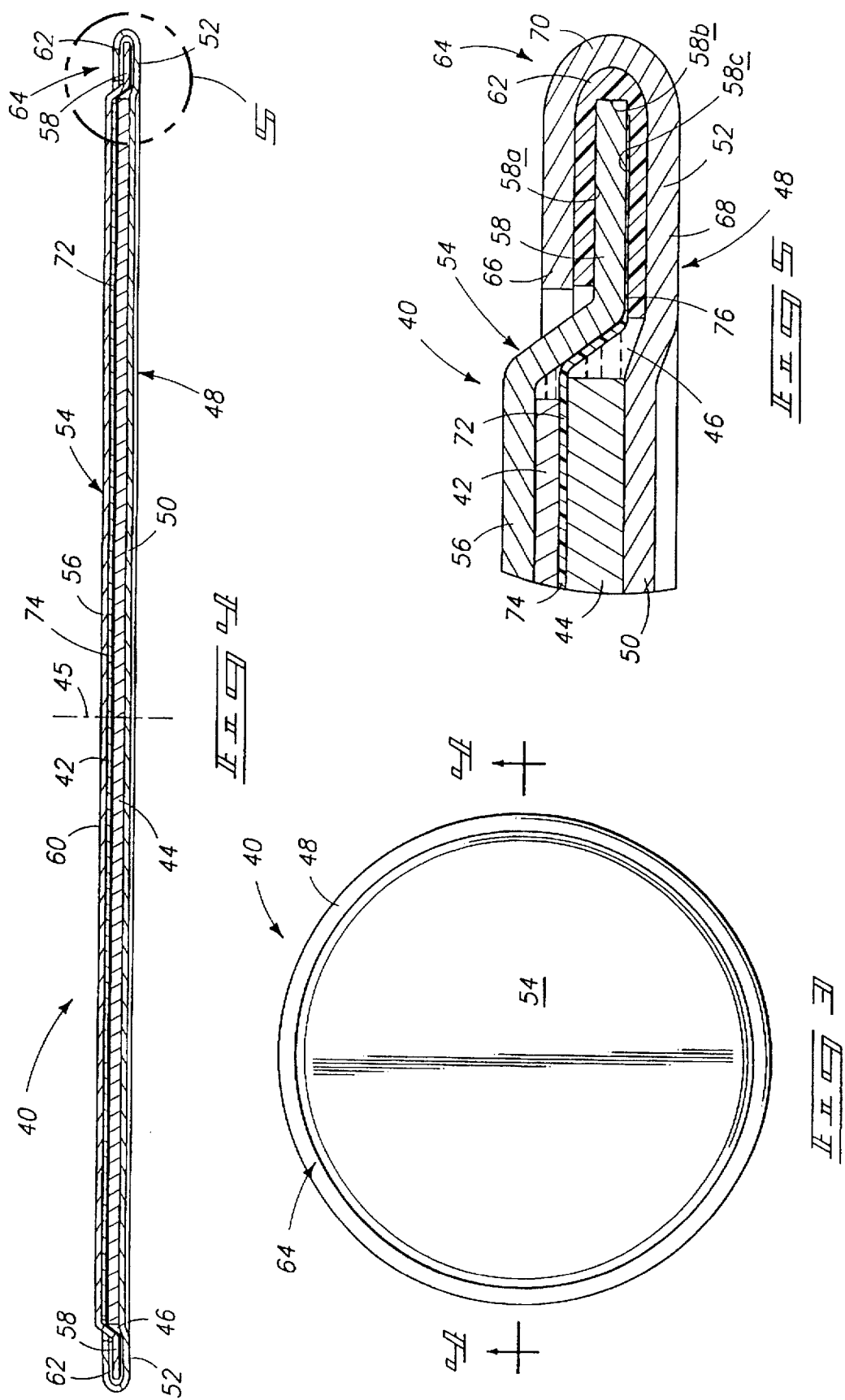

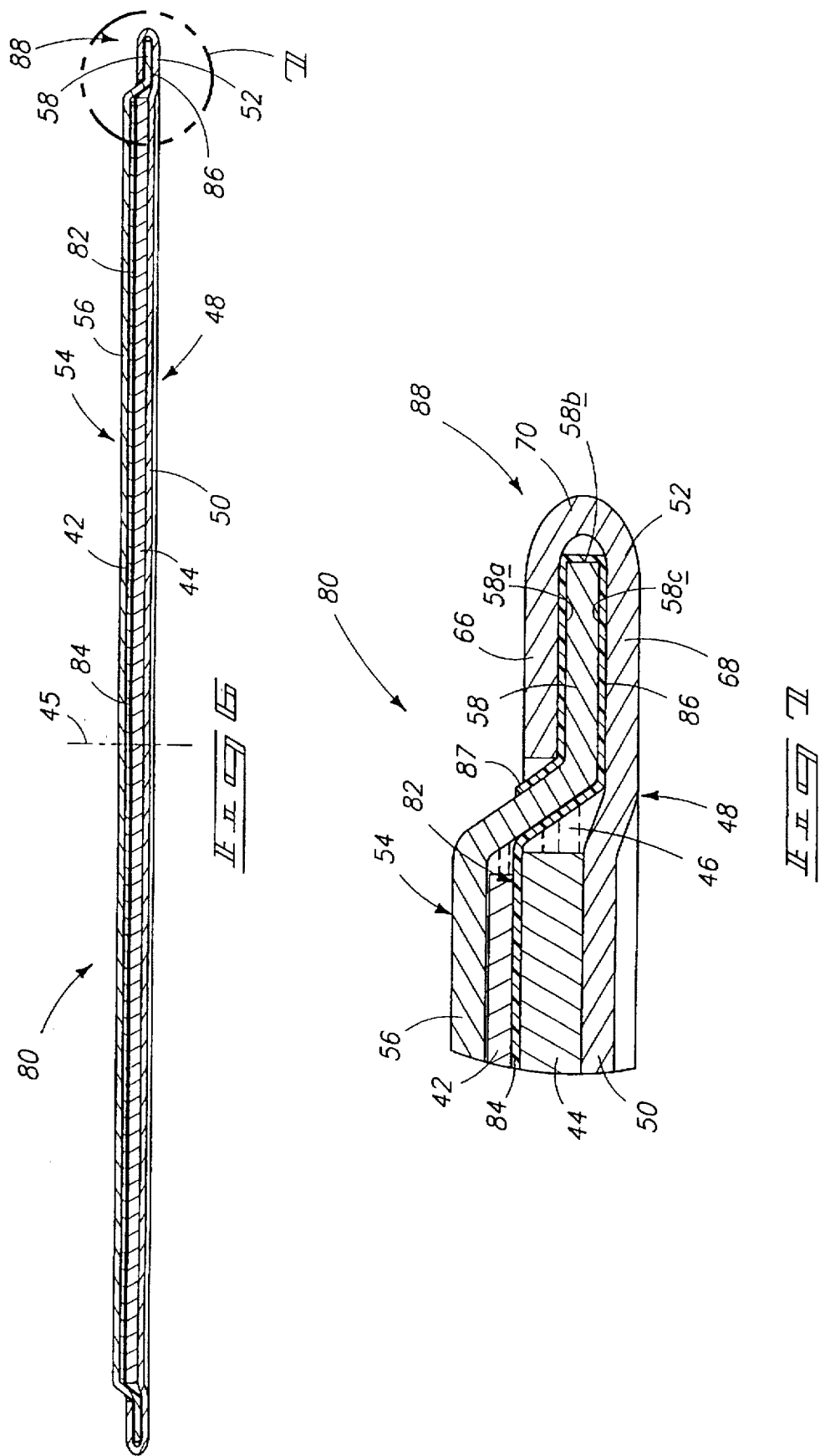

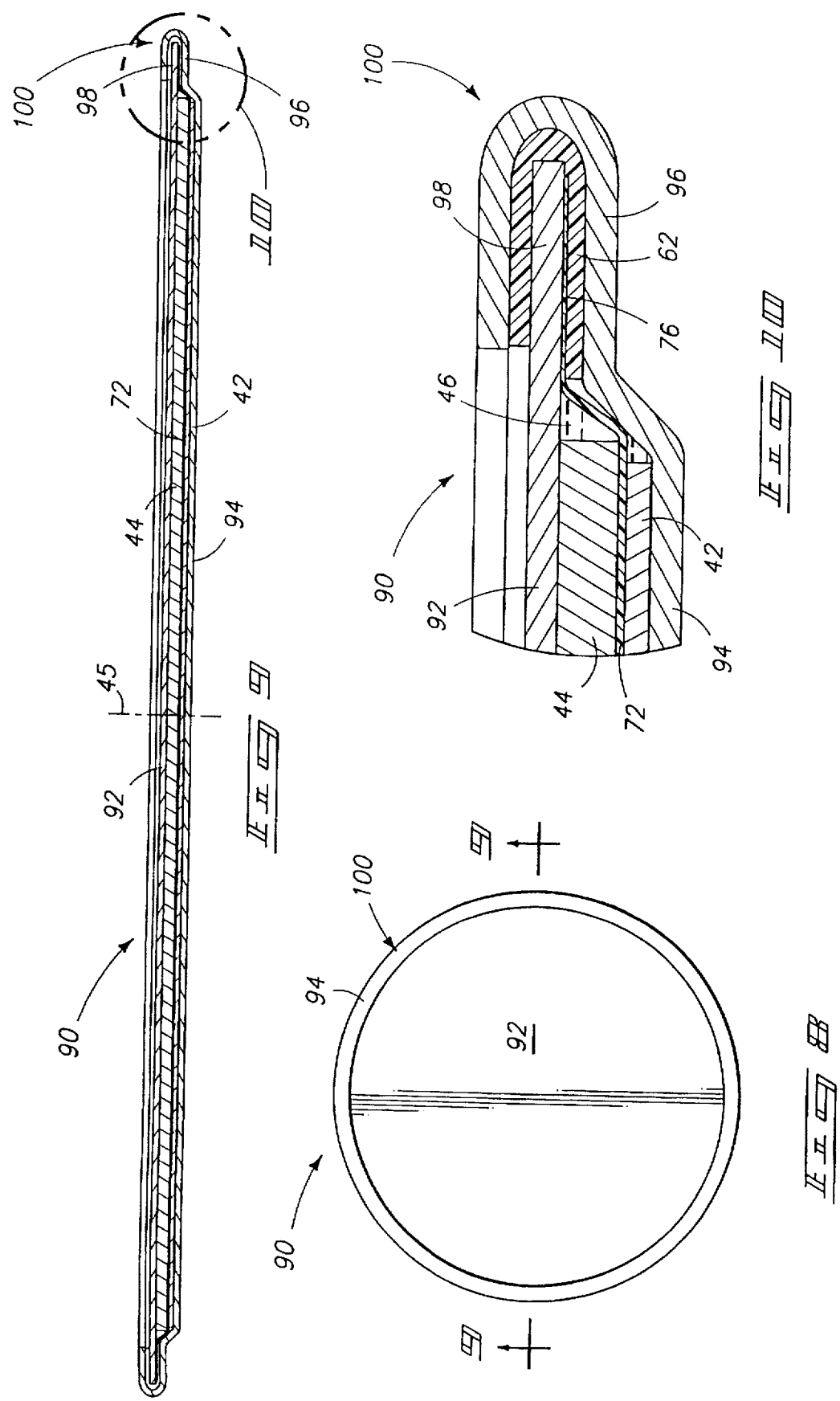

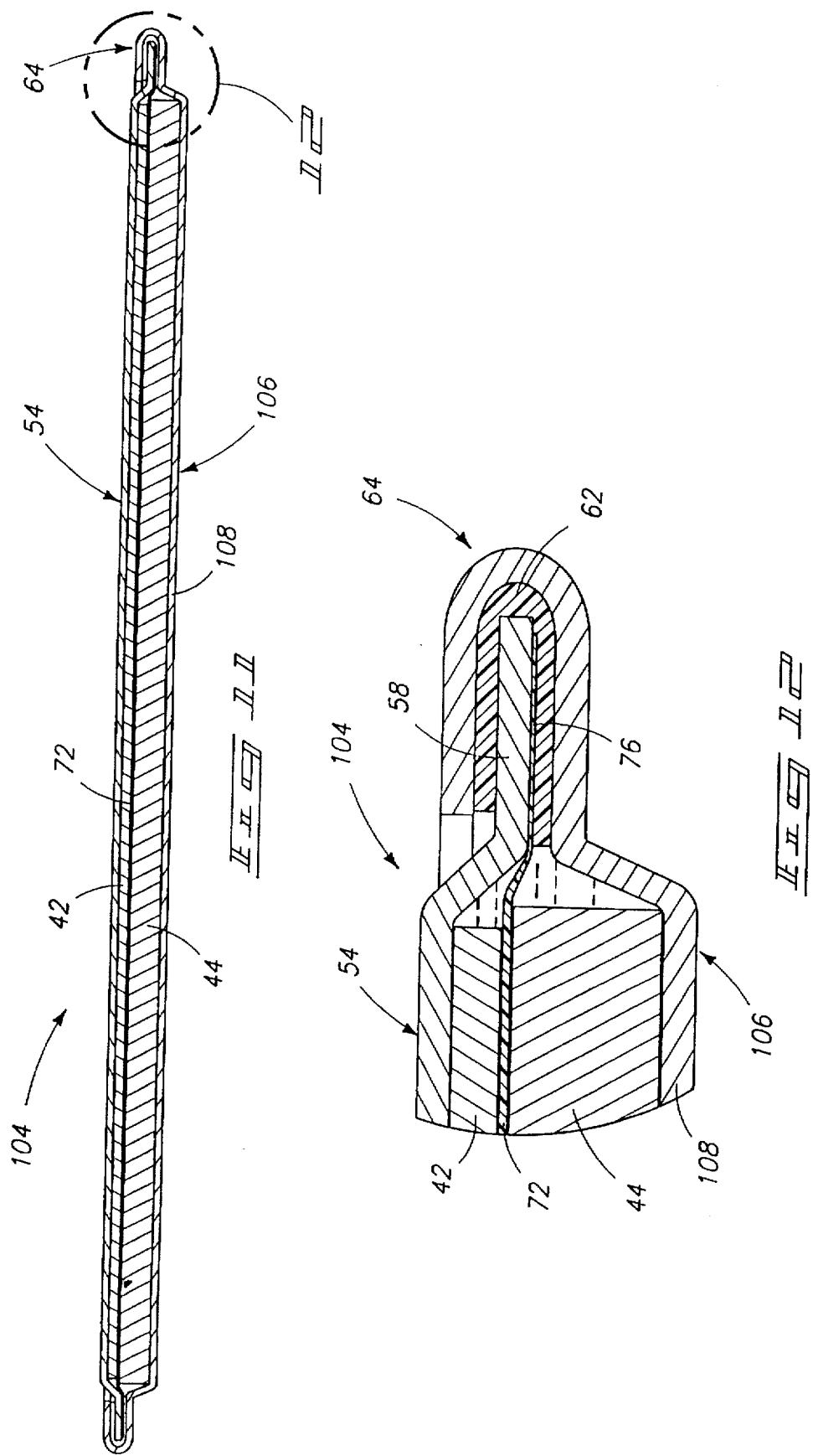

THIN PROFILE BATTERY WITH IMPROVED SEPARATOR AND GASKET CONSTRUCTION

This patent is a file wrapper continuation application of U.S. patent application Ser. No. 08/744,743, filed on Oct. 28, 1996, now abandoned, entitled "Thin Profile Battery With Improved Separator And Gasket Construction" listing the inventors as Peter M. Blonsky and Mark E. Tuttle, which resulted from a divisional application of U.S. patent application Ser. No. 08/588,559, filed on Jan. 18, 1996, now U.S. Pat. No. 5,652,070, entitled "Button-Type Battery With Improved Separator And Gasket Construction" listing the inventors as Peter M. Blonsky and Mark E. Tuttle, which resulted from a divisional application of U.S. patent application Ser. No. 08/205,611, filed on Mar. 2, 1994, now U.S. Pat. No. 5,547,781, entitled "Button-Type Battery With Improved Separator And Gasket Construction" listing the inventors as Peter M. Blonsky and Mark E. Tuttle.

TECHNICAL FIELD

This invention relates to button-type batteries.

BACKGROUND OF THE INVENTION

Button-type batteries are small thin energy cells that are commonly used in watches and other electronic devices requiring a thin profile. FIGS. 1 and 2 show a conventional button-type battery 20. Battery 20 includes an anode 22, a cathode 24, a porous separator 26 separating the anode and cathode, and an electrolyte 28 which facilitates ion conductivity between the anode and cathode.

These internal battery components are housed within a metal casing formed by a lower conductive can 30 and an upper conductive lid 32. Can 30 electrically contacts cathode 24 and thereby forms the positive battery terminal. Lid 32 electrically contacts anode 22 to form the negative battery terminal. The can and lid are crimped or pressed together to form a fluid-tight seal 34 which entirely encloses the anode, cathode, separator, and electrolyte. An insulating gasket 36 is provided within primary seal 34 between lid 32 and can 30 to electrically insulate the two housing members.

There is a need in button-type battery usage to make such energy cells thinner. Today, the thinnest commercially available button-type battery has a thickness of 1.2 mm (47.2 mils). It would be desirable to make a thinner battery, particularly one having a thickness of less than 1 mm (39.4 mils). A countering concern, however, is that the integrity of the fluid-tight seal cannot be compromised simply to achieve the goal of thinner batteries.

Accordingly, it is desirable to design a button-type battery with a very thin profile, yet without degrading the integrity of the fluid-tight seal.

BRIEF DESCRIPTION OF THE DRAWINGS

Preferred embodiments of the invention are described below with reference to the following accompanying drawings. The same components and features illustrated throughout the drawings are referenced with like numerals.

FIG. 3 is a top view of a button-type battery according to this invention.

FIG. 4 is a cross-sectional view taken along line 4—4 in FIG. 3 of the button-type battery according to a first preferred embodiment of this invention.

FIG. 5 is an enlarged cross-sectional view taken within circle 5 of FIG. 4 and shows a C-shaped fluid-tight crimp seal according to this invention.

FIG. 6 is a cross-sectional view similar to that view taken along line 4—4 in FIG. 3 of a button-type battery according to a second preferred embodiment of this invention.

FIG. 7 is an enlarged cross-sectional view taken within circle 7 of FIG. 6 and shows a C-shaped, fluid-tight crimp seal.

FIG. 8 is a top view of a button-type battery according to a third less preferred embodiment of this invention.

FIG. 9 is a cross-sectional view taken along line 9—9 in FIG. 8.

FIG. 10 is an enlarged cross-sectional view taken within circle 10 in FIG. 9.

FIG. 11 is a cross-sectional view similar to that taken along line 4—4 in FIG. 3 and shows a button-type battery according to a fourth less preferred embodiment of this invention.

FIG. 12 is an enlarged cross-sectional view taken in circle 12 of FIG. 11.

DETAILED DESCRIPTION OF THE PREFERRED EMBODIMENTS

Figure 1:
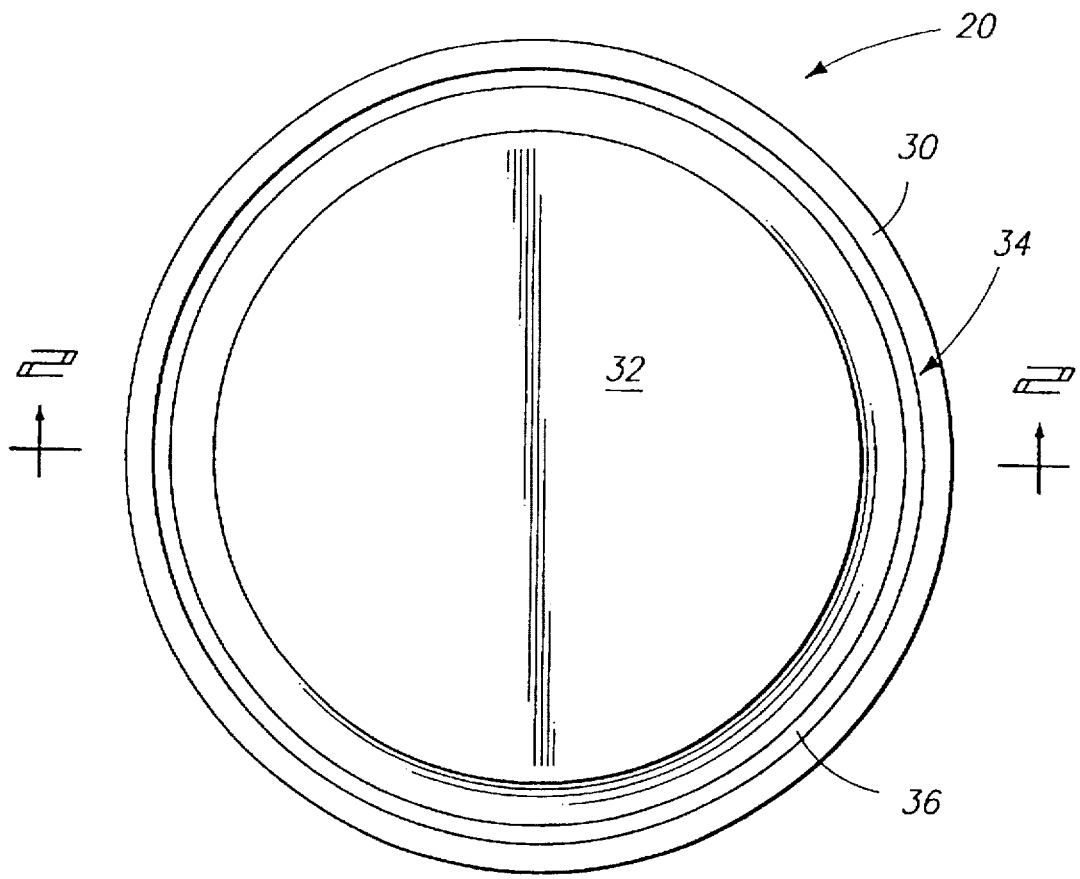
FIG. 1 is a top view of a prior art button-type battery.
Figure 2:
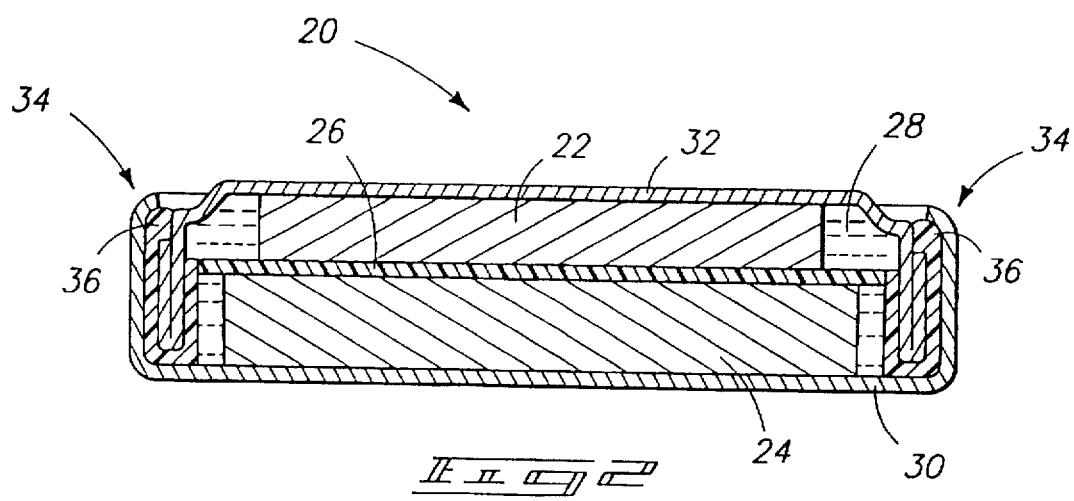
FIG. 2 is a cross-sectional view taken along line 2—2 in FIG. 1 of the prior art button-type battery.

This disclosure of the invention is submitted in furtherance of the constitutional purposes of the U.S. Patent Laws "to promote the progress of science and useful arts" (Article 1, Section 8).

This invention concerns "coin" or "button-type" batteries. A button-type battery is typically a small circular-shaped energy cell approximately the size of a coin. The button-type battery can be constructed in different sizes, with typical diameters being 12 mm, 16 mm, and 20 mm. Other shapes are possible, but the circular shape is most common.

According to one aspect of this invention, a button-type battery comprises:

an anode;

a cathode positioned adjacent to the anode;

an electrolyte between the anode and the cathode;

a conductive first terminal housing member in electrical contact with one of the anode or the cathode; the first terminal housing member having a periphery;

a conductive second terminal housing member in electrical contact with the other of the anode or the cathode; the second terminal housing member having a periphery;

the first and second terminal housing members forming an enclosed housing which holds and protects the anode and the cathode;

the first and second terminal housing member peripheries being configured together to form a seal which seals the anode and the cathode within the housing formed by the first and second terminal housing members; and a separator provided between and separating the anode and the cathode; the separator having a periphery that extends between the first and second terminal housing member peripheries at least partially into the seal.

According to another aspect of this invention, a button-type battery comprises:

an anode;

a cathode positioned adjacent to the anode;

an electrolyte between the anode and the cathode;

a conductive first terminal housing member in electrical contact with one of the anode or the cathode; the first terminal housing member having a periphery;

a conductive second terminal housing member in electrical contact with the other of the anode or the cathode; the second terminal housing member having a periphery;

the first and second terminal housing members forming an enclosed housing which holds and protects the anode and cathode;

an integral separator and gasket layer; the integral layer having (1) a central portion positioned between the anode and cathode to physically separate the anode and the cathode and to facilitate electrolytic conductivity between the anode and the cathode, and (2) a portion peripheral to the central portion, the peripheral portion being positioned between the first and second terminal housing member peripheries; and the first and second terminal housing member peripheries and the peripheral portion of the integral separator and gasket layer being configured together to form a fluid-tight seal which seals the anode and cathode within the housing formed by the first and second terminal housing members, the peripheral portion of the integral layer electrically insulating the first terminal housing member from the second terminal housing member.

Research culminating in the invention disclosed herein also resulted in other inventions. These other inventions are the subject of other U.S. patents which spawned from patent applications filed on the same day of the patent application from which this U.S. patent matured. These other patent applications are U.S. patent application Ser. No. 08/206,051 filed on Mar. 2, 1994, "Method Of Producing Button-Type Batteries And Spring-Biased Concave Button-Type Battery", listing John R. Tuttle and Mark E. Tuttle as inventors (now U.S. Pat. No. 5,486,431); U.S. patent application Ser. No. 08/205,590 filed on Mar. 2, 1994, "Methods Of Producing Button-Type Batteries And A Plurality Of Battery Terminal Housing Members", listing Rickie Lake and Peter M. Blonsky as inventors (now U.S. Pat. No. 5,603,157); and U.S. patent application Ser. No. 08/205,957 filed on Mar. 2, 1994, "Button-Type Battery Having Bendable Construction, and Angled Button-Type Battery", listing Mark E. Tuttle and Peter M. Blonsky as inventors (now U.S. Pat. No. 5,432,027). These co-filed patent applications and resulting patents are hereby incorporated by reference as if fully included herein.

FIGS. 3–5 show a button-type battery 40 according to a first preferred embodiment of this invention. Battery 40 has an anode 42, a cathode 44 positioned adjacent to the anode, and a liquid electrolyte 46 between the anode and cathode. Anode 42 and cathode 44 are aligned along a transverse central axis 45.

Button-type battery 40 also includes a circular conductive first, lower, or bottom terminal housing member 48 which forms the can of the energy cell. First terminal housing member 48 has a central portion 50 in electrical contact with cathode 44 and a periphery 52 surrounding central portion 50. First housing member 48 defines the positive battery terminal because it contacts cathode 44.

Battery 40 has a circular conductive second, upper, or top terminal housing member 54 which forms the lid of the energy cell. The second terminal housing member 54 has a central portion 56 in electrical contact with anode 42 and a periphery 58 surrounding central portion 56. By contacting anode 42, second housing member 52 defines the negative battery terminal. First and second terminal housing members 48 and 54 combine to form an enclosed housing 60 which holds and protects anode 42, cathode 44, and electrolyte 46. It should be noted that the first and second terminal housing members 48 and 54 can be alternately reversed to electrically contact anode 42 and cathode 44, respectively, thereby reversing their respective terminal polarities.

Anode 42, cathode 44, and electrolyte 46 can be formed of conventional construction. For example, in the reduction to practice models, anode 42 comprises elemental lithium provided on a copper backed foil. Anode 42 has a preferred thickness of approximately 2 mils (0.0508 mm). Cathode 44 is formed of a compressed tablet made from a composite of manganese (IV) oxide, carbon, and teflon powder. Cathode 44 has a preferred thickness of 8 mils (0.2032 mm).

An example electrolyte 36 comprises a solution of propylene carbonate and ethylene glycol dimethylether, having dissolved lithium tetrafluoroborate. Suitable electrolyte components are supplied by Aldrich Chemical Company of Milwaukee, Wis. The volume of electrolyte 46 provided within first terminal housing member 48 is preferably gauged to fill the substantial void within housing member 48, yet not so great to leak upon crimp sealing the battery assembly.

First and second terminal housing members 48 and 52 are preferably formed of a conductive material having a thickness of less than 8 mils (0.2032 mm), with a thickness in a range of approximately 3–5 mils (0.0762–0.1270 mm) being more preferred, and a thickness of 4 mils (0.1016 mm) being most preferred. An example material used for the terminal housing members is Type 304 stainless steel manufactured by Teledyne Rodney Metals of New Bedford, Mass.

An insulating gasket 62 is provided between first and second terminal housing member peripheries 52 and 58 to electrically insulate first terminal housing member 48 from second terminal housing member 54. Gasket 62 is preferably formed of an epoxy resin that is screen printed onto can periphery 52 of first terminal housing member 48. Gasket 62 can alternately be deposited onto all three sides 58a, 58b, 58c of lid periphery 58 of second terminal housing member 54. The gasket can be formed of one or more layers of epoxy resins, with varying degrees of hardness. An example composite gasket has a harder outer epoxy layer adjacent to battery can periphery 52 and an inner softer epoxy layer. Epoxy gasket material of different resultant hardness are available from Electronics Materials, Inc., of Brookfield, Conn. Alternately, gasket 62 can be formed of other insulative materials, such as polyimide.

First and second terminal housing member peripheries 52 and 58 and insulating gasket 62 are configured together to form a fluid-tight seal 64 which fluidically seals anode 42, cathode 44, and electrolyte 46 within housing 60. Seal 64 is preferably a C-shaped crimp seal. This crimp seal is constructed by bending can periphery 52 about lid periphery 58.

FIG. 5 shows the C-shape crimp seal 64 is more detail. Second terminal housing member periphery 58 is substantially planar within the seal and projects substantially radially outward from central axis 45 (i.e., horizontal in the drawings). First terminal housing member periphery 52 and insulating gasket 62 wrap around three sides 58a, 58b, 58c of battery lid periphery 58. First terminal housing member periphery 52 consists of two substantially planar segments 66 and 68 on respective opposing sides 58a and 58c of the substantially planar second terminal housing member 58 and a continuously bending segment 70 on side 58b of lid periphery 58. Continuously bending segment 70 connects upper segment 66 and lower segment 68 and has an example radius of curvature of 3.5 mils (0.0889 mm). Most preferably, the planar lid periphery 58 and the planar upper and lower segments 66 and 68 of can periphery 52 are all substantially in parallel.

The action associated with forming C-shape crimp seal 64 produces an indentation in circular first terminal housing member 48. This is caused by the thickness of housing member 48 and the radius of bending segment 70 being in combination effectively small to induce compressive stresses which result in such upward contraction.

Button-type battery 40 also includes a separator 72 provided between anode 42 and cathode 44. Separator 72 includes a central portion 74 which physically separates anode 42 and cathode 44 and a peripheral portion 76 surrounding central portion 74. Separator peripheral portion 76 extends between the first and second terminal housing member peripheries 52 and 58 at least partially into seal 64. More particularly, separator periphery 76 is interposed between insulating gasket 62 and lid periphery 58 to thereby partially overlap with insulating gasket 62. It should be noted that when gasket 62 is deposited onto lid periphery 58, separator periphery 76 will be interposed between insulating gasket 62 and can periphery 52.

Separator 72 is preferably formed of a woven or porous polymeric material, such as polyethylene, polypropylene, or teflon. Separator 72 has unidirectional pores formed in the Z direction parallel to central axis 45 to facilitate electrolytic conductivity between anode 42 and cathode 44. Separator 72 has a preferable thickness of 1 mil (0.0254 mm). However, separator periphery 76 is compressed during crimping into a substantially flat layer having a thickness less than 1 mil (0.0254 mm).

Button-type battery 40 of this invention is advantageous over prior art batteries in that separator 72 extends into the crimped seal 64 to ensure complete separation between anode 42 and cathode 44. Additionally, button-type battery 40 has a very thin profile due to the reduced material thicknesses as well as the C-shaped crimp seal 64. The total combined thickness of the anode 42, cathode 44, separator 72, and the first and second terminal housing members 48 and 54 is less than 1 mm, and is most preferably approximately 0.5 mm or less.

FIGS. 6 and 7 illustrate a button-type battery 80 according to a second preferred embodiment of this invention. Battery 80 is constructed very similar to battery 40 illustrated in FIGS. 4 and 5. The noted difference is that button-type battery 80 is configured without an insulating gasket, and instead uses a single, integral separator and gasket layer 82. Integral layer 82 has a central portion 84 positioned between anode 42 and cathode 44 to physically separate the anode and the cathode. Insulator 82 is porous and thus facilitates electrolytic conductivity between the anode and cathode.

Integral layer 82 also has a peripheral portion 86 which surrounds central portion 84. Peripheral portion 86 is positioned between first and second terminal housing member peripheries 52 and 58. In this manner, housing peripheries 52 and 58 and integral layer peripheral portion 86 are configured together to form a fluid-tight seal 88 which seals the anode, cathode, and electrolyte within the housing. The peripheral portion 86 thereby electrically insulates the first terminal housing member 48 from the second terminal housing member 54. Accordingly, integral separator and gasket layer 82 in this second embodiment serves the dual functions of (1) physically separating the anode and cathode, while promoting electrolytic conductivity therebetween, and (2) electrically insulating the two housing members.

Integral layer 82 is formed of a porous polymeric material, such as that described above. The separator may be pre-formed such that the central portion 84 has a thickness greater than that of the peripheral portion 86. Preferably, central portion 84 of integral layer 82 has a thickness of approximately 1 mil (0.0254 mm) whereas peripheral portion 86 has a thickness of approximately 0.5 mil (0.0172 mm). Additionally, peripheral portion 86 of integral separator and gasket layer 82 has a greater density than that of central portion 84. The pre-forming densification of the peripheral portion can be achieved by heat embossing which effectively closes the pores and flattens the polymeric material. Alternatively, the peripheral portion 86 can be densified from the compression that occurs during the crimping action which forms seal 88.

During assembly, the integral layer is cut in a disk shape and oversized so that extra material hangs out beyond lid 54. The integral layer is held in place during the automated assembly operation which crimps first terminal housing member periphery 52 about second terminal housing member periphery 58 to form the C-shaped crimp seal. In this manner, peripheral portion 86 of integral layer 82 is folded around all three sides 58a, 58b, and 58c to insure complete electrical insulation between housing member peripheries 52 and 58. Preferably, peripheral portion 86 has a peripheral edge 87 that extends exteriorly beyond seal 88 and radially inwardly toward axis 45 on the exterior of battery housing 60. Peripheral edge 87 projects at least partially up along the sloped section of second terminal housing member 54 (FIG. 7).

Button-type battery 80 is advantageous over prior art batteries in that integral separator and gasket layer 82 reduces manufacturing costs and shortens assembly time. Specifically, only a single piece of material is used for both the separating and insulating tasks in the battery cell, as compared to prior art cells which employ two independent components (i.e. both a separator and a gasket). The integral layer thereby reduces manufacturing costs. Additionally, assembly time is reduced because the three steps associated with pre-forming a gasket, positioning the gasket within the can, and positioning the separator over the cathode are reduced to a single step of positioning the oversized integral layer over the cathode.

FIGS. 8–10 illustrate a button-type battery 90 according to a less preferred third embodiment of this invention. Battery 90 differs from battery 40 illustrated in FIGS. 4 and 5 in the construction of the housing members. Button-type battery 90 has a substantially planar, disk-shaped first terminal housing member 92. Second terminal housing member 94 has periphery 96 which is crimped around lid periphery 98 to form a C-shaped crimp seal 100 similar to seal 64 described above in detail. It should also be noted that anode 42 and cathode 44 are reversed so that cathode 44 is electrically contacting second terminal housing member 92 and anode 42 is electrically contacting second terminal housing member 94. Separator 72 separates anode 42 and cathode 44 and has a periphery 76 that extends radially outward from central axis 45 between housing member peripheries 96 and 98 at least partially into C-shaped crimp seal 100.

FIGS. 11 and 12 illustrate a button-type battery 104 according to a less preferred fourth embodiment of this invention. Battery 104 is similar to button-type battery 40, except that it is designed with a slightly thicker profile. Battery 104 has a first terminal housing member 106 which has a central portion 108 that projects from C-shaped crimp seal 64 away from second terminal housing member 54 to accommodate a thicker anode 42 and cathode 44. The combined total thickness of anode 42, cathode 44, separator 72, and first and second terminal housing members 54, 106 is greater than 20 mils (0.508 mm), as compared to the thinner profile button-type battery 40 of FIG. 3, but is still preferably less than 40 mils (or approximately 1 mm).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A circular-shaped thin profile battery defined by a thickness which is less than a maximum linear dimension of its anode, comprising:

an anode and a cathode;

a conductive first terminal housing member having a periphery and being in electrical contact with one of the anode or the cathode, the conductive first terminal housing member periphery comprising a planar extension;

a conductive second terminal housing member having a periphery and being in electrical contact with the other of the anode or the cathode, the conductive second terminal housing member periphery comprising a planar extension parallel to the planar extension of the conductive first terminal housing member periphery;

the first and second terminal housing members together forming an enclosed housing which surrounds the anode and cathode;

a single undivided separator/gasket, said separator/gasket consisting of only one material; the separator/gasket having (1) a central portion positioned between the anode and cathode to physically separate the anode and the cathode and to facilitate electrolytic conductivity between the anode and the cathode, and (2) a peripheral portion which is peripheral to the central portion, the peripheral portion being positioned between the first and second terminal housing member peripheries; the central portion contacting both the anode and the cathode; the separator/gasket peripheral portion comprising a planar extension which extends along the planar extension of the one of the terminal housing member peripheries and parallel with the planar extensions of both of the terminal housing member peripheries, the separator/gasket physically contacting only one of the terminal housing members; the planar extension of the separator/gasket being between the planar extensions of the terminal housing member peripheries;

the planar extensions of the first and second terminal housing member peripheries and the planar extension of the peripheral portion of the separator/gasket together forming a fluid-tight seal; and wherein;

the separator/gasket is formed of a porous material;

the central portion has a first thickness and a first density; and the peripheral portion has a second thickness less than the first thickness and a second density greater than the first density.

2. The circular-shaped thin profile battery of claim 1 wherein the terminal housing member in physical contact with the separator/gasket is the same terminal housing member that is in electrical contact with the anode.

* * * * *